United States Patent
Bullard

[19]

[11] Patent Number: 5,924,682
[45] Date of Patent: Jul. 20, 1999

[54] DROP-IN SEAT SPRING UNIT ASSEMBLY

[75] Inventor: Larry I. Bullard, Winston Salem, N.C.

[73] Assignee: L&P Property Management Company, South Gate, Calif.

[21] Appl. No.: 08/883,796

[22] Filed: Jun. 27, 1997

Related U.S. Application Data

[63] Continuation-in-part of application No. 08/600,418, Feb. 13, 1996, abandoned, which is a continuation-in-part of application No. 08/174,977, Dec. 29, 1993.

[51] Int. Cl.$^6$ .................................................. F16F 3/00
[52] U.S. Cl. .................................................. 267/103; 5/309
[58] Field of Search .................................................. 267/90, 91, 94, 267/97, 99, 100, 101, 103, 105, 166, 166.1, 178, 179, 107; 297/452, 445; 5/309, 267

[56] References Cited

U.S. PATENT DOCUMENTS

| | | |
|---|---|---|
| 793,853 | 7/1905 | Smith . |
| 803,933 | 11/1905 | Smith . |
| 1,793,421 | 2/1931 | Burch . |
| 3,425,068 | 2/1969 | Bechtoldt . |
| 3,662,411 | 5/1972 | Garceau . |
| 3,953,903 | 5/1976 | Lawrence et al. . |
| 4,004,304 | 1/1977 | Kane . |
| 4,160,544 | 7/1979 | Higgins . |
| 4,372,546 | 2/1983 | Ramsey . |
| 4,480,823 | 11/1984 | Marcinczyk et al. . |
| 4,790,038 | 12/1988 | Ikeda . |
| 4,819,920 | 4/1989 | Barber . |
| 5,940,255 | 8/1991 | Barber, Jr. . |

OTHER PUBLICATIONS

Leggett & Platt, Inc., Coil Flex Advanced Coil Spring Seating.

*Primary Examiner*—Peter M. Poon
*Attorney, Agent, or Firm*—Wood, Herron & Evans, L.L.P.

[57] ABSTRACT

A drop-in spring unit seat assembly includes a top grid spaced from a bottom grid having conical springs positioned therebetween. The conical springs are snap-fit for attachment to the top grid and/or bottom grid and require no mechanical fasteners nor complicated tools for such attachment. A pair of opposed detents are formed in the top and/or bottom turns of the spring and/or the detents formed in grid wires extending on the top and/or bottom grid. The opposed detent in the springs snap-fit engage with the depressions in the grid wires and a plurality of springs are interposed between the top grid and bottom grid to form the spring unit assembly. In selected embodiments, the spring unit includes multiple bottom grids attached via springs to a single top grid. The assembled spring unit can be dropped into a chair, seat or other article of furniture for attachment to and support by a pair of spaced frame members of the chair or other article of furniture.

27 Claims, 5 Drawing Sheets

DROP-IN SEAT SPRING UNIT ASSEMBLY

This is a continuation-in-part of application Ser. No. 08/600,418 filed Feb. 13, 1996, now abandoned, which in turn was a continuation-in-part of application Ser. No. 08/174,977 filed Dec. 29, 1993. Each of the above-identified applications are hereby expressly incorporated by reference herein.

BACKGROUND OF THE INVENTION

This invention relates to a coil spring unit assembly, and more particularly to a coil spring unit assembly for use as a drop-in seat component.

In the assembly of furniture comprising coil springs, coil springs are variously mounted on or supported by wooden slats; steel slats, bars, or wires; or woven webbing or sheeting materials which require stretching and stapling to the frame and often require additional support from steel bands. The bottom ends of the coil springs are thus required to be attached to these support systems by means such as stapling, twisting coil ends into slots or over intersected wires, crimping, clipping or clinching. The top ends of the coil springs are commonly unitized by means of combinations of crimped wires and wire hooks; cross helicals; helical lacing wire; or pre-made grid material, requiring clipping or clinching. The coil tops are also commonly attached to a perimeter border wire by means of clips and/or by wrapping the ends of the top crimp wires around the border wire.

Assembling the spring unit by utilizing attachment clips or intertwining metal elements together is an expensive and tedious operation involving considerable costs in both material and labor. Furthermore, assembly in such a manner requires a degree of skill and expertise in utilizing the specific attachment hardware and tools required for securing the upper turns of the coil springs to the top grid structure. As a result of the specialized tools and skills required to attach the coil springs to the wire grid, the spring unit components and assemblies are often required to be manufactured at the spring manufacturer, which means that the unit must be shipped to the chair or furniture company only after it has been fully assembled by the skilled personnel at the spring company. Shipment of the fully assembled spring assemblies typically requires baling to compress the spring assemblies for economical transportation, which is very expensive; which requires the furniture manufacturer to invest in bale opening equipment; which can be hazardous; and which can lead to damaged product.

SUMMARY OF THE INVENTION

It has been a primary objective of this invention to provide an improved spring unit assembly in which the top and/or bottom turns of the spring are attached to upper and/or lower supporting structures, respectively, without the need for additional mechanical fasteners, complicated tools, or labor intensive and time consuming assembly procedures.

It has been a further objective of this invention to provide an improved spring unit assembly which minimizes the stresses placed on the wooden components of the frame structure.

This invention features a novel coil spring for snap-in interconnection to a top grid and/or a bottom grid to form a novel spring unit assembly for furniture, particularly chair seats and backs. Both the top and bottom grids of this invention in one embodiment include a metallic border wire extending around the periphery of the spring unit assembly. A set of longitudinal and a set of transverse wires are generally perpendicular to each other and are secured at their terminal ends to the border wires and are preferably joined together or welded at their intersections. The metallic spring unit assembly of this invention, including the top and bottom grids and springs, offers a stronger and more reliable chair seat while reducing the overall complexity and cost of the chair compared to chair seats utilizing traditional coil systems.

A pair of adjacent longitudinal grid wires in combination with a pair of adjacent transverse grid wires define a cell within each of the grids. A plurality of cells are defined in the top grid and each cell in the top grid has a corresponding, generally vertically aligned, cell in the bottom grid.

Coil springs are interposed between the top and bottom grids and the upper end of each coil spring is secured to a cell in the top grid and the bottom end of each coil spring is secured to the corresponding cell in the bottom grid. The coil springs are advantageously secured to the top and/or bottom grids by a novel snap-fit interconnection, without the benefit of additional fasteners, complicated tools or skilled laborers.

The transverse grid wires in one embodiment defining each cell contain a deviating depression in a plane perpendicular to the plane of the grid on opposite sides of each cell. A pair of opposed V-notch configuration detents may be formed into both the top and bottom turns of the conical spring. The opposed V-notched depressions are in the plane of the top and bottom turns of the spring and are oriented to correspond to and be aligned with the opposed deviating depressions in the grid wires.

The springs are attached to the grids by temporarily manually contracting the grid wires to cause the deviating depressions to clear the detents in the springs. The grid wires are then allowed to contract to their normal configuration, thereby engaging the V-notched spring detents with the deviating depressions on the grid wires. Alternatively, the top or bottom turn of the spring can be manually expanded once the first V-notch detent has engaged the aligned depression in the grid wire. Expanding the top or bottom turn of the spring enables the opposing V-notch detent to engage the aligned depression. The turn in the spring is then allowed to contract, to thereby secure the spring to the grid. This snap-in attachment of the springs to the grids is provided for both the top and bottom grid members, thereby permitting the assembly of the spring unit without the need for mechanical fasteners or complicated tools, time-consuming procedures or specialized skills.

Because the spring unit of this invention can be easily assembled, the grids and springs can be compactly shipped in a knock-down (K-D) configuration from the manufacturer for later assembly, thereby reducing shipping and transportation costs and eliminating the hazards and damages associated with the baling and the opening of compressed bales of assembled spring units. As a result, the furniture manufacturer has the option of assembling the spring unit without any mechanical fasteners, which includes manually attaching the springs to the bottom grid or grids and attaching the top of the springs to a top grid by hand tying with twine or cord, or with mechanically fastening the springs to the top and/or bottom grid as desired. The spring unit can be assembled by the furniture manufacturer before it is installed in the frame, or the components of the system can be assembled in steps as it is being installed in the frame. For example, the bottom grid can be attached to the frame and then the coil springs snapped into the bottom grid and the top grid snapped onto the coil springs to complete the spring unit assembly.

The assembled spring unit can be conveniently positioned or dropped into the wooden frame of a chair seat or other piece of furniture. As a result, the spring unit assembly is referred to as a "drop-in" seat. The bottom grid of the spring unit assembly is supported by rail members of the wooden frame and is conveniently secured in place by attaching the bottom grid border wire to the wooden members as by hooks, staples, or other fasteners. The spring unit assembly is easily dropped in place and supported by the outer frame members of the chair or seat, thereby reducing the need for complicated spring attachment mechanisms while still providing a comfortable, easily assembled and sturdy chair or piece of furniture.

BRIEF DESCRIPTION OF THE DRAWINGS

The objectives and features of this invention will become more readily apparent from the following detailed description taken in conjunction with the accompanying drawings in which.

DETAILED DESCRIPTION OF THE INVENTION

Figure 1:
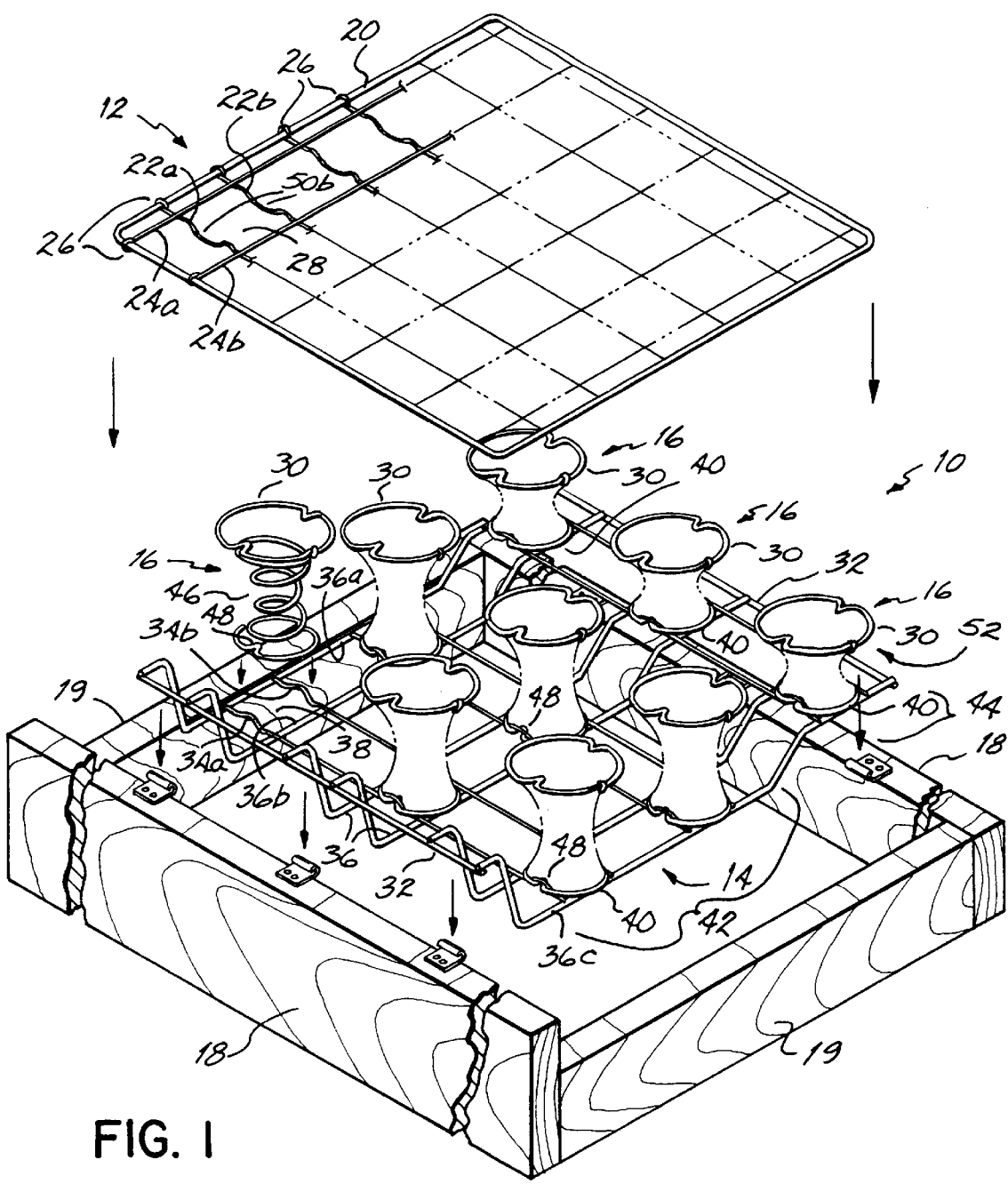
FIG. 1 is an exploded partial perspective view of a first embodiment of this invention.

Referring to FIG. 1, a first embodiment of the spring unit assembly 10 is shown comprising a generally rectangular top grid 12 spaced from a generally rectangular bottom grid 14. The top grid 12 is supported in spaced relation to the bottom grid 14 by a plurality of coiled springs 16, the upper ends of which are secured to the top grid 12 and the lower ends of which are secured to the bottom grid 14. Although the present invention is described as including both a top and bottom grid, it will be appreciated by one of ordinary skill in the art that the scope of this invention includes spring unit assemblies without a top grid as shown in the accompanying drawings. The spring unit assembly 10 is adapted to be supported as a so-called drop-in seat section by a pair of spaced usually wooden frame members 18 within a rectangular frame 19 of the chair seat or other article of furniture.

The top grid 12 includes a peripheral border wire 20 extending around the perimeter of the grid 12 and is preferably constructed of Number 6 gauge wire. Spaced transverse grid wires 22 and longitudinal grid wires 24 are each attached to opposing ends of the border wire 20 by loops 26 or other suitable fasteners. The transverse grid wires 22 are generally perpendicular to the longitudinal grid wires 24. The grid wires 22, 24 are positioned so that a pair of adjacent transverse grid wires 22a, 22b and a pair of adjacent longitudinal grid wires 24a, 24b define a substantially rectangular cell 28 for receiving the top of the spring coil 16. The distance between the adjacent grid wires 22a, 22b and 24a, 24b which define a cell 28 is less than the diameter of a top turn 30 of each coil spring 16 so that the spring 16 can support the top grid 12 without the top portion of the spring 16 projecting therethrough.

The bottom grid 14 consists of a perimeter border wire 32 preferably constructed of Number 6 gauge metal wire extending around the periphery of the bottom grid 14. The bottom grid 14 also includes transverse grid wires 34 and longitudinal grid wires 36 positioned thereon in a generally perpendicular relationship to one another and secured at terminal ends thereof to the border wire 32 as by welding or mechanical fasteners (not shown). A pair of adjacent longitudinal grid wires 36a, 36b and a pair of adjacent transverse grid wires 34a, 34b define a cell 38 in the bottom grid 14 for supporting the bottom portion of the coil spring 16 thereon. The diameter of a bottom turn 40 of the spring 16 is larger than the width or length of the cell 38. The longitudinal grid wires 24, 36 and the transverse grid wires 22, 34 in both the top and bottom grids 12, 14 are preferably joined at their respective intersections by a weldment attachment.

When the spring unit 10 is assembled, each bottom grid cell 38 will be vertically aligned with a corresponding top grid cell 28 and have a spring coil 16 extending therebetween and attached thereto. The bottom grid longitudinal wires 36 are preferably constructed of Number 6 gauge wire and the outward most lateral longitudinal wire 36c on each side of the bottom grid 14 corresponds to the border wire 32 thereby serving as both the border wire 32 and longitudinal grid wire 36 in a preferred embodiment of this invention. The transverse grid wires 22, 34 in both the top and bottom grids 12, 14 are preferably constructed of Number 13½ gauge wire.

The bottom grid 14 preferably includes a centrally depressed portion 42 being positioned in a plane lower than an elevated portion 44 on each end of the bottom grid 14, although the scope of this invention is not to be limited to non-planar bottom grids but may include flat bottom grids with coil springs of generally equal height. The depressed portion 42 advantageously is included so that the springs 16 positioned thereon are taller, with more turns, than those springs 16 positioned on the elevated portions 44 where the bottom grid 14 is attached to the wooden frame members 18. The taller springs 16 on the centrally depressed portion 42 provide more resilient support to the center portion of the drop-in spring unit seat section 10. The spring unit assembly of this invention with the depressed portion 42 in the bottom grid 14 is configured to be dropped into and supported by the rectangular frame 19 of the chair seat or other article of furniture.

The springs 16 in this invention are preferably double cone springs having enlarged diameter upper and lower turns 30, 40 with respect to intermediate turns 46 of the spring 16. A pair of opposed V-notch configured detents 48, 48 are formed into both the upper turn 30 and lower turn 40 of each spring 16. The V-notch detents 48, 48 are diametrically opposite each other on both the upper and lower turns 30, 40 of the spring 16 and are directed inwardly toward the center line axis of the spring 16 in the plane of the upper turn 30 and lower turn 40, respectively. The springs 16 are preferably constructed from a heavy gauge wire.

Figure 3:
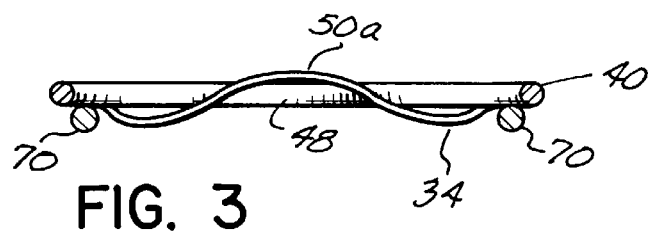
FIG. 3 is a cross-sectional view taken along line 3—3 of FIG. 2 showing the snap-in attachment of a conical spring.

The transverse grid wires 22, 34 in both the top and bottom grids 12, 14 include deviations or depressions 50 on opposing sides of each cell 28, 38. The depressions 50 in the bottom grid transverse wires 34 are upwardly directed depressions 50a; whereas, the depressions 50 in the top grid transverse wires 22 are downwardly directed depressions 50b. For the snap-in attachment of the top turn 30 of each spring 16 to the top grid 12 and the bottom turn 40 of each spring 16 to the bottom grid 14, the spring 16 is positioned on the respective grid 12, 14 in an offset relationship with respect to the cell 28, 38 to which it will be attached. The spring is then slid in place on the cell 28, 38 such that one of the V-notch detents 48 on the spring 16 engages one of the depressions 50 in the transverse grid wire 22, 34 which is aligned thereto, resulting in the depression 50 being looped up and over the V-notched detent 48 on the bottom turn 40 of the spring 16 or down and around the V-notched detent 48 on the top turn 30 of the spring 16, as shown in FIG. 3.

To secure the opposing V-notched detent 48 on the spring 16 to the opposing depression 50, the opposite transverse wire 22, 34 in the grid 12, 14 is manually and temporarily deflected inwardly toward the center of the cell 28, 38 until the V-notched detent 48 in the spring 16 can be inserted within the depression 50. The transverse wire 22, 34 is then released and allowed to expand to its normal configuration thereby engaging the V-notched detent 48 and securing the spring 16 to the grid 12, 14. A similar snap-in process is repeated for each spring 16 to be attached to the bottom and top grids 12, 14. Alternatively, the spring 16 can be snapped into the grid 12, 14 by expanding the turn 30, 40 so that the V-notch detent 48 engages the opposing depression 50 and then releasing the spring 16 and the turn 30, 40 contracts to engage the depression 50 and secure the spring 16.

As shown in FIG. 1, the plurality double cone springs 16 are arranged on the bottom grid 14 with a row of springs 52 corresponding to the elevated portion 44 of the bottom grid 14. The springs 16 on the elevated portion 44 are shorter with fewer turns than those springs 16 positioned on the depressed portion 42 of the bottom grid 14. Once the individual springs 16 are snap-fit onto the bottom grid 14 and the top grid 12 as described, the spring unit assembly 10 is conveniently dropped into the seat and supported by the spaced wooden frame members 18 of the rectangular frame 19 in the chair or other furniture. The border wire 32 on the bottom grid 14 is secured to the frame members 18 as by hooks 54 or other appropriate fasteners.

Figure 2:
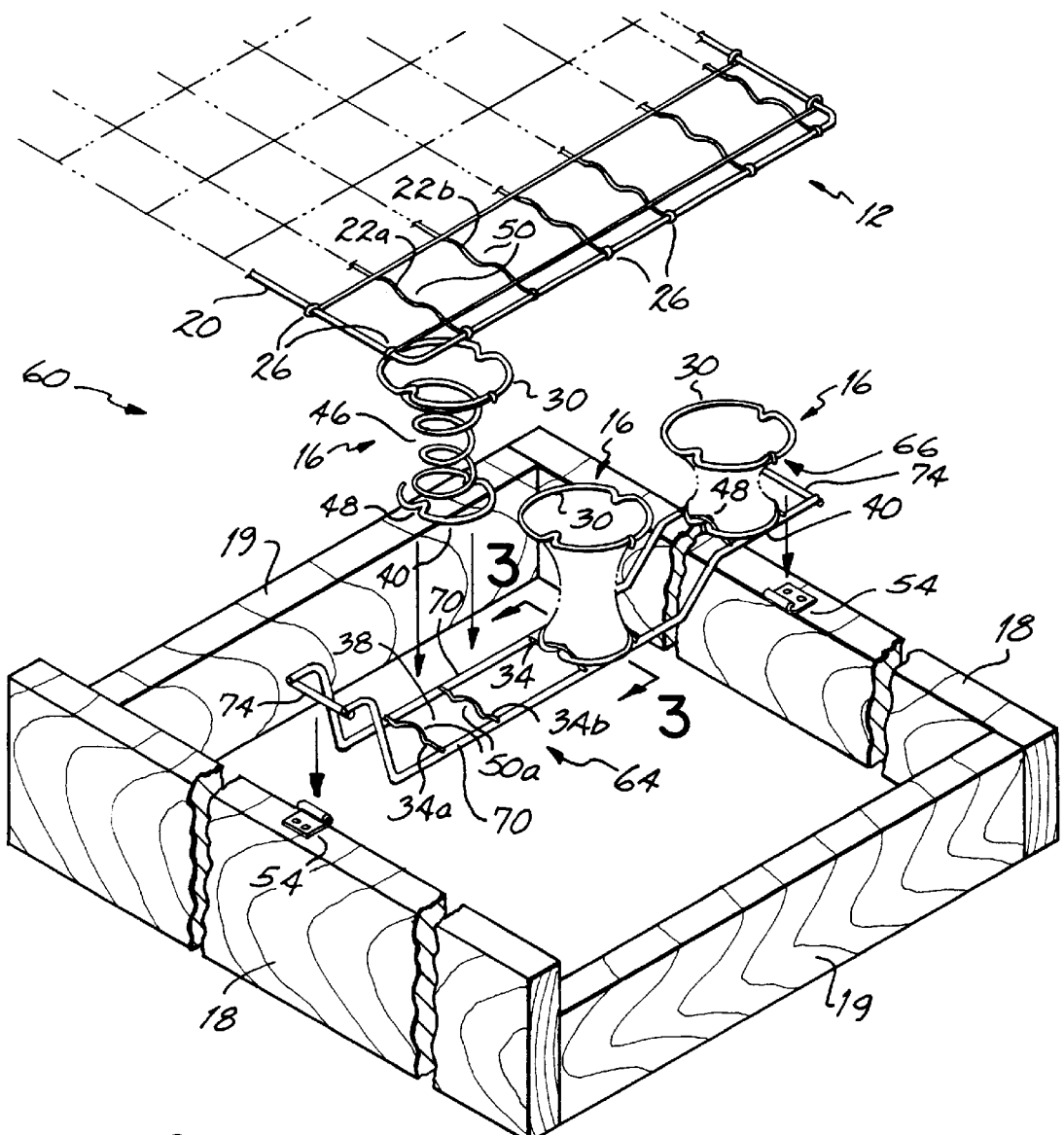
FIG. 2 is an exploded partial perspective view of a second embodiment of this invention.

A second preferred embodiment of this invention is shown in FIG. 2 with like reference numerals indicating like elements with respect to the first preferred embodiment. A spring unit assembly 60 of this embodiment includes a plurality of double cone springs 16 positioned between a top grid 12 and a single strip bottom grid 64. The top turn 30 and bottom turn 40 of each spring 16 is snap-fit for attachment to the top grid 12 and bottom grid 64, respectively, as previously described. However, the bottom grid 64 of this embodiment includes only a single row of double cone springs 16 so that longitudinal grid wires 70 in the bottom grid 64 correspond to a border wire 74 in this portion of the grid 64. A plurality of bottom grids 64 and attached springs 16 are used with the top grid 12 in this embodiment of the invention. Each single strip bottom grid 64 is secured to the frame members 18 as by hooks 54 or other appropriate fasteners.

The second embodiment of this invention as shown in FIG. 3 is particularly useful to provide resilient support in specific areas of chairs or other furniture which may have unique geometries or cannot accommodate the full spring unit assembly 10 as shown in FIG. 1.

Figure 4:
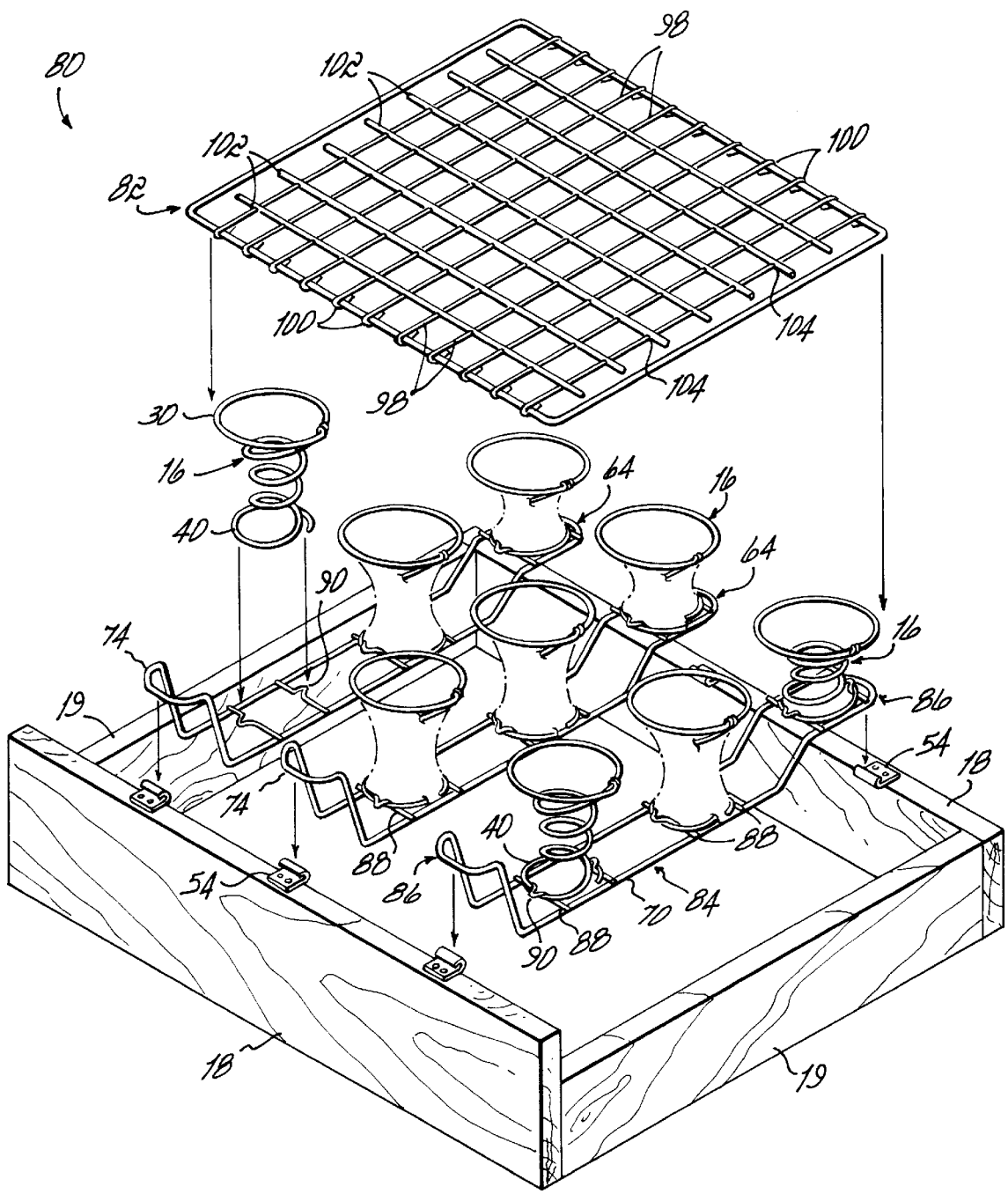
FIG. 4 is an exploded perspective view of a third embodiment of this invention.
Figure 5:
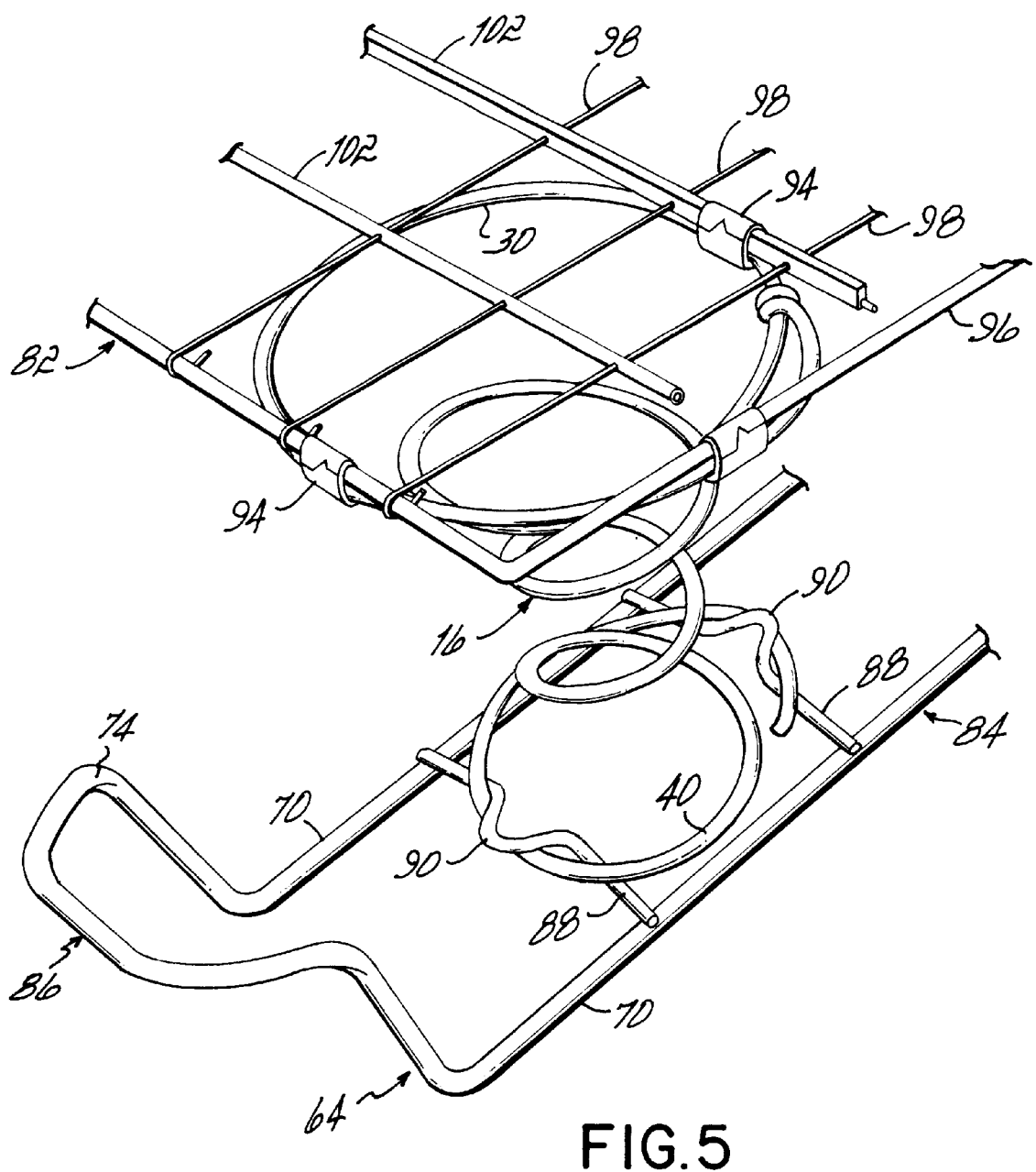
FIG. 5 is an enlarged partial perspective view of a spring connected to a top and a bottom grid of the embodiment of FIG. 4.

Referring to FIGS. 4 and 5, a third presently preferred embodiment of a spring unit assembly 80 according to this invention is shown with like reference numerals indicating like elements with respect to the previously discussed embodiments. A spring unit assembly 80 of this embodiment includes a plurality of double cone springs 16 positioned between a top grid 82 and a plurality of single strip bottom grids 64. The top turn 30 and bottom turn 40 of each spring 16 is attached to the top grid 82 and associated bottom grid 64, respectively. Similar to the second embodiment shown in FIG. 2, the bottom grid 64 of this embodiment includes only a single row of double cone springs 16 so that longitudinal grid wires 70 in the bottom grid 64 correspond to a border wire 74 in this portion of the grid 64. A plurality of bottom grids 64 and attached springs 16 are used with the top grid 82 in this embodiment of the invention. Each single strip grid 64 is secured to the frame members 18 as by hooks 54 or other fasteners.

Each bottom grid 64 preferably includes a centrally depressed portion 84 being positioned in a plane lower than an elevated portion 86 on each end of the bottom grid 64. The depressed portion 84 is advantageously included in the invention so that the springs 16 positioned thereon are taller, with more turns, than those springs 16 positioned on the elevated portion 86 of the bottom grid 64. This embodiment of the invention with the depressed and elevated portions is commonly referred to in the industry as a "spring edge" unit. However, the present invention is not limited to this configuration but may include springs of equal heights in the spring unit assembly. This type of assembly is commonly referred to in the industry as a "hard edge" unit.

As shown in FIGS. 4 and 5, the bottom turn 40 of each spring 16 is preferably snap-fit to the respective bottom grid 64 without the benefit of mechanical fasteners, clips or the like. The snap-fit connection shown in FIGS. 4 and 5 is different than those of the previous embodiments in that the bottom turn 40 of the spring 16 does not include a detent, depression or other manufacturing variation. As a result, the springs 16 manufactured for use with this embodiment do not require specialized manufacturing techniques, production runs or the like and can be readily used in other spring unit applications thereby minimizing the cost of production of spring unit assemblies according to this invention.

As shown in FIGS. 4 and 5, the transverse grid 88 wires which include an elevated V-notched depression 90 which is directed outwardly from the interior of the bottom grid cell. The bottom turn 40 of the spring 16 is expanded temporarily to be snap fit onto the opposed V-notched depressions in the transverse grid wires 88. Preferably, the V-notched depressions 90 are elevated in a central portion of the transverse grid wires 88 relative to the remainder of the bottom grid as shown particularly in FIG. 5. Additionally, the terminal end 92 of the bottom turn 40 of the spring is deflected inwardly to provide a security end to the coil to ensure that it will not rotate off of the bottom grid 64 once attached thereto. The top turn 30 of the individual springs 16 are attached to the top grid 82 via opposing clips 94 as shown in FIG. 5. The top grid 82 according to the embodiment of the invention shown in FIGS. 4 and 5 preferably includes a border wire 96 which comprises a steel metal core coated with a sheath of plastic. The longitudinal wires 98 in the top grid 82 are metal and terminate at the border wire in loops 100 for attachment thereto. The transverse grid wires 102 of this embodiment of the top grid 82 are preferably plastic and include holes 104 through which the longitudinal grid wires 98 are inserted to construct the top grid 82. Preferably, the transverse grid wires 102 do not extend the entire width of the top grid 82 and are not attached to the border wire 96 as shown in FIGS. 4 and 5. It should be readily understood by one of ordinary skill in the art that the top turn 30 of the springs 16 of the embodiment of this invention shown in FIGS. 4 and 5 may be attached without mechanical fasteners to the top grid 82, for example, through the snap-fit connection previously described or other appropriate means.

Figure 6:
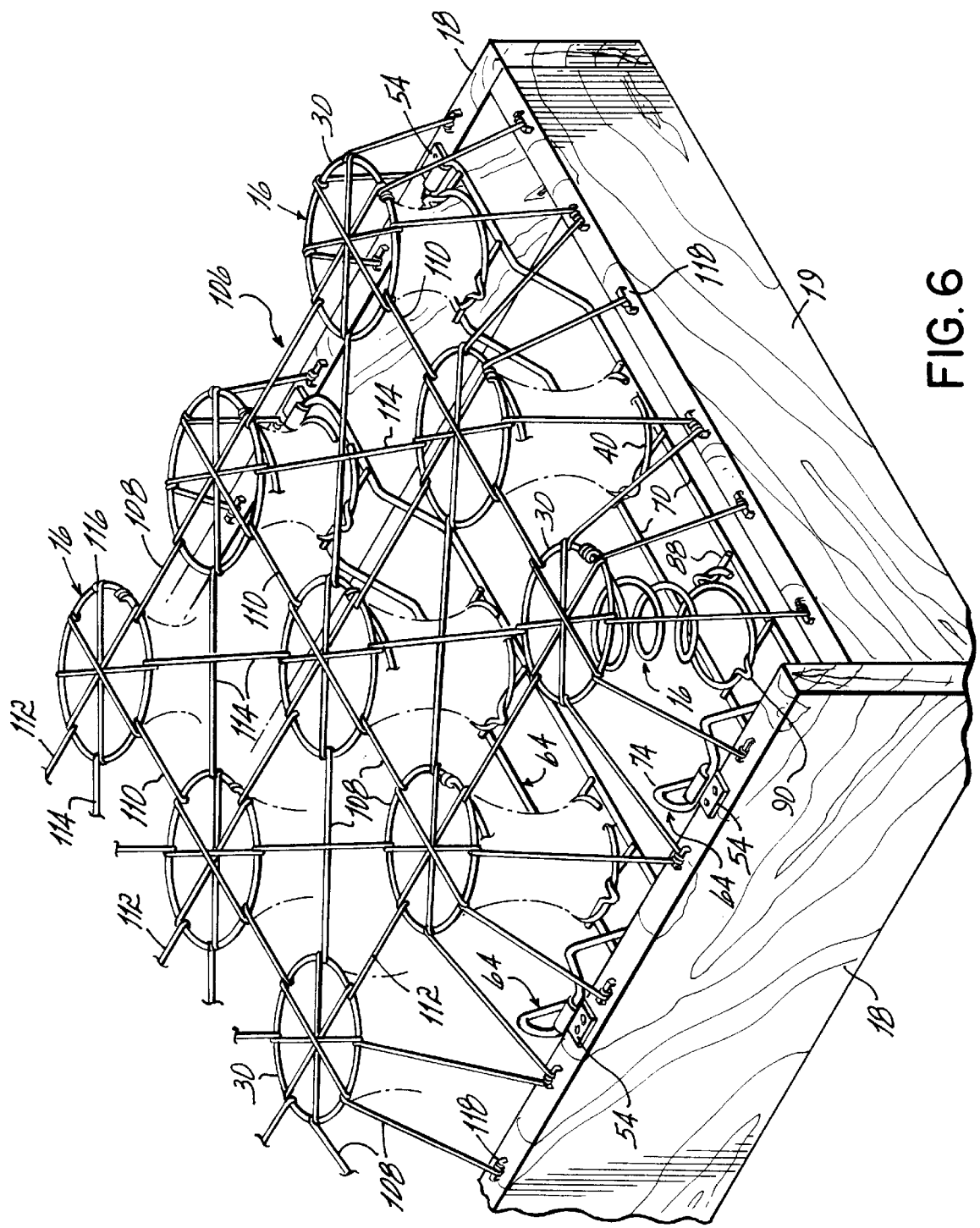
FIG. 6 is a partial perspective view of a fourth embodiment of this invention.

A fourth presently preferred embodiment of this invention is shown in FIG. 6 and which like reference numerals indicate like elements with respect to the previous embodiments. As with previous embodiments of the invention, the spring unit assembly includes a plurality of single row bottom grids 64 in combination with a single top grid 106. A primary difference between the fourth embodiment and the third embodiment previously described with reference to FIGS. 4 and 5 is the construction of the top grid. The top grid 106 of the embodiment shown in FIG. 6 is constructed with tieing twine 108, preferably 100% polyester or nylon twine or other appropriate twine as is readily understood by one of ordinary skill in the art. The top grid 106 may be attached to the top turn 30 of the springs 16 in FIG. 6 without the benefit of mechanical fasteners by hand tieing the twine 108 to the individual top turns 30 of the springs 16. One presently preferred method of constructing and attaching the top grid 16 is with an eight-way hand tied configuration such as that shown in FIG. 6. The resulting top grid 106 includes individual longitudinal sections 110, transverse sections 112 and diagonal sections 114 of twine 108 in which the top turn 30 is manually tied with the twine 108 at eight different locations 116. The eight-way hand tied top grid 106 shown in FIG. 6 may advantageously be constructed after the individual components of the spring unit assembly are shipped to the furniture manufacture. Therefore, the components can be shipped in a knocked down or compacted configuration for assembly and construction by the furniture manufacturer.

Another feature of the to grid 106 of the embodiment shown in FIG. 6 is that the top grid 106 can be attached to the frame portion 19 of the seating structure. The twine 108 can be tied off and/or connected to the frame portions 18 at staples 118 spaced along the frame portions 18 as shown in FIG. 6.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof.

I claim:

1. A method for making a seating structure comprising:
   constructing a frame portion of the seating structure;
   securing a plurality of individual bottom grids of a spring assembly to said frame portion, each said bottom grid comprising a plurality of longitudinal and transverse wires and a border wire extending around a periphery of said bottom grid, each said transverse wire terminating at an intersection with said border wire, pairs of adjacent said longitudinal wires combining with pairs of adjacent said transverse wires to define bottom grid cells;
   attaching a bottom turn of a spring to selected ones of said bottom grid cells without benefit of additional mechanical fasteners; and
   attaching a top grid to a top turn of each said spring without benefit of additional mechanical fasteners, said top grid comprising a plurality of longitudinal and transverse wires and a border wire extending around a periphery of said top grid, pairs of adjacent said longitudinal wires combining with pairs of adjacent said transverse wires to define top grid cells, each said top grid cell being generally vertically aligned with a corresponding said bottom grid cell, wherein said plurality of said bottom grids are attached to said top grid via said springs to form said spring assembly.

2. The method of claim 1 wherein said attaching of said spring to said selected ones of said bottom grid cells and said attaching of said top grid to each said spring are both accomplished prior to said securing of said bottom grid to said frame portion.

3. A method for making a seating structure comprising:
   constructing a generally rectangular frame portion of the seating structure;
   securing a plurality of individual bottom grids of a spring assembly to said frame portion with mechanical fasteners, each said bottom grid comprising a plurality of longitudinal and transverse wires and a border wire extending around a periphery of said bottom grid, each said transverse wire terminating at an intersection with said border wire, pairs of adjacent said longitudinal wires combining with pairs of adjacent said transverse wires to define bottom grid cells, each said bottom grid cell having a pair of opposed upwardly directed depressions in one of said pairs of adjacent transverse wires and said pairs of adjacent longitudinal wires;
   attaching a bottom turn of a spring to selected ones of said bottom grid cells without benefit of additional mechanical fasteners by engaging each of said upwardly directed depressions with one of a pair of detents in said bottom turn of said spring; and
   attaching a top grid to a top turn of each said spring without benefit of additional mechanical fasteners, said top grid comprising a plurality of longitudinal and transverse wires and a border wire extending around a periphery of said top grid, pairs of adjacent said longitudinal wires combining with pairs of adjacent said transverse wires to define top grid cells, each said top grid cell being generally vertically aligned with a corresponding said bottom grid cell, each said top grid cell having a pair of opposed downwardly directed depressions in one of said pairs of adjacent transverse wires and said pairs of adjacent longitudinal wires, said top grid being attached to each said spring by engaging each of said downwardly directed depressions with one of a pair of detents in said top turn of said spring, wherein said plurality of said bottom grids are attached to said top grid via said springs to form said spring assembly.

4. The method of claim 3 wherein said attaching of said spring to said selected ones of said bottom grid cells and said attaching of said top grid to each said spring are both accomplished prior to said securing of said bottom grid to said frame portion.

5. The method of claim 3 further comprising:
   welding said transverse wires and said longitudinal wires in each of said top or bottom grids to each other at intersections thereof.

6. A method of assembling a spring assembly adapted to be dropped into and to form a seating structure, said method comprising:
   attaching a bottom turn of a spring to selected cells in one of a plurality of individual bottom grids without benefit of additional mechanical fasteners, each said bottom grid comprising a plurality of longitudinal and transverse wires and a border wire extending around a periphery of said bottom grid, each said transverse wire terminating at an intersection with said border wire, pairs of adjacent said longitudinal wires combining with pairs of adjacent said transverse wires to define said bottom grid cells; and
   attaching a top grid to a top turn of each said spring without benefit of additional mechanical fasteners, said top grid comprising a plurality of longitudinal and transverse wires and a border wire extending around a periphery of said top grid, pairs of adjacent said longitudinal wires combining with pairs of adjacent said transverse wires to define top grid cells, each said top grid cell being generally vertically aligned with a corresponding said bottom grid cell, wherein said plurality of said bottom grids are attached to said top grid via said springs to form said spring assembly.

7. The method of claim 6 further comprising:
welding said transverse wires and said longitudinal wires in each of said top or bottom grids to each other at intersections thereof.

8. A method of assembling a spring assembly adapted to be dropped into and to form a seating structure, said method comprising:
attaching a bottom turn of a spring to selected cells in one of a plurality of individual bottom grids without benefit of additional mechanical fasteners, each said bottom grid comprising a plurality of longitudinal and transverse wires and a border wire extending around a periphery of said bottom grid, each said transverse wire terminating at an intersection with said border wire, pairs of adjacent said longitudinal wires combining with pairs of adjacent said transverse wires to define said bottom grid cells, each said bottom grid cell having a pair of opposed upwardly directed depressions in one of said pairs of adjacent transverse wires and said pairs of adjacent longitudinal wires, said bottom turn being attached to said selected bottom grid cells by engaging each of said upwardly directed depressions with one of a pair of detents in said bottom turn of said spring; and
attaching a top grid to a top turn of each said spring without benefit of additional mechanical fasteners, said top grid comprising a plurality of longitudinal and transverse wires and a border wire extending around a periphery of said top grid, pairs of adjacent said longitudinal wires combining with pairs of adjacent said transverse wires to define top grid cells, each said top grid cell being generally vertically aligned with a corresponding said bottom grid cell, each said top grid cell having a pair of opposed downwardly directed depressions in one of said pairs of adjacent transverse wires and said pairs of adjacent longitudinal wires, said top grid being attached to each said spring by engaging each of said downwardly directed depressions with one of a pair of detents in said top turn of said spring, wherein said plurality of said bottom grids are attached to said top grid via said springs to form said spring assembly.

9. The method of claim 8 further comprising:
welding said transverse wires and said longitudinal wires in each of said top or bottom grids to each other at intersections thereof.

10. The method of claim 9 wherein said securing further comprises securing first and second opposing sides of said bottom border wire into an opened arcuate shaped portion of a plurality of J-shaped hook type fasteners on said frame portion, said opened arcuate shaped portion being open toward an exterior of said frame portion.

11. The method of claim 9 wherein said securing of said bottom grid to said fasteners on said frame portion is accomplished after said spring assembly is formed.

12. A method for making a seating structure comprising:
constructing a frame portion of the seating structure;
securing a plurality of individual bottom grids of a spring assembly to said frame portion, each said bottom grid comprising a plurality of longitudinal and transverse wires and a border wire extending around a periphery of said bottom grid, each said transverse wire terminating at an intersection with said border wire, pairs of adjacent said longitudinal wires combining with pairs of adjacent said transverse wires to define bottom grid cells;
attaching a bottom turn of a spring to selected ones of said bottom grid cells without benefit of additional mechanical fasteners; and
attaching a top grid to a top turn of each said spring, said top grid comprising a plurality of longitudinal and transverse wires and a border wire extending around a periphery of said top grid, pairs of adjacent said longitudinal wires combining with pairs of adjacent said transverse wires to define top grid cells, each said top grid cell being generally vertically aligned with a corresponding said bottom grid cell, wherein said plurality of said bottom grids are attached to said top grid via said springs to form said spring assembly.

13. The method of claim 12 wherein said attaching of said top grid to each said spring is accomplished with mechanical fasteners.

14. A method for making a seating structure comprising:
constructing a frame portion of the seating structure;
securing a plurality of individual bottom grids of a spring assembly to said frame portion, each said bottom grid comprising a plurality of transverse wires and a border wire extending around a periphery of said bottom grid, each said transverse wire terminating at an intersection with said border wire, pairs of said transverse wires combining with portions of said border wire to define bottom grid cells;
attaching a bottom turn of a spring to selected ones of said bottom grid cells without benefit of additional mechanical fasteners; and
attaching a top grid to a top turn of each said spring without benefit of additional mechanical fasteners.

15. The method of claim 14 wherein said attaching of said top grid comprises manually tying twine to said top turn of each said spring.

16. The method of claim 15 further comprising:
tying said twine to each said top turn of each said spring at eight locations on said top turn, said top grid comprising a plurality of lateral, longitudinal and diagonal sections of said twine.

17. The method of claim 14 further comprising:
attaching said top grid to said frame portion.

18. A method for making a seating structure comprising:
constructing a frame portion of the seating structure;
securing a plurality of individual bottom grids of a spring assembly to said frame portion, each said bottom grid comprising a plurality of transverse wires and a border wire extending around a periphery of said bottom grid, each said transverse wire terminating at an intersection with said border wire, pairs of adjacent said transverse wires combining with portions of said border wire to define bottom grid cells;
attaching a bottom turn of a spring to selected ones of said bottom grid cells without benefit of additional mechanical fasteners;
attaching a top grid to a top turn of each said spring without benefit of additional mechanical fasteners by manually tying twine to said top turn of each said spring, said top grid comprising a plurality of lateral, longitudinal and diagonal sections of said twine; and tying said twine to each said top turn of each said spring at eight locations on each said top turn.

19. A spring assembly for use in a seating structure, the spring assembly comprising:

a plurality of individual bottom grids, each said bottom grid comprising a plurality of transverse wires and a border wire extending around a periphery of said bottom grid, each said transverse wire terminating at an intersection with said border wire, pairs of said transverse wires combining with portions of said border wire to define bottom grid cells;

a bottom turn of each of a plurality of springs attached to selected ones of said bottom grid cells; and a top grid attached to a top turn of each said spring.

20. The spring assembly of claim 19 wherein said bottom turn of each said spring is attached to said respective bottom grid without benefit of mechanical fasteners.

21. The spring assembly of claim 19 wherein said top turn of each said spring is attached to said top grid without benefit of mechanical fasteners.

22. The spring assembly of claim 19 wherein each said bottom grid has a plurality of springs attached thereto and one of said plurality of springs attached to each said bottom grid is shorter than the other of said plurality of springs.

23. The spring assembly of claim 19 wherein said top grid is at least one of the following materials: metal, nylon, polyester, and plastic.

24. The spring assembly of claim 19 wherein said top grid further comprises:

a plurality of transverse, longitudinal and diagonal sections of twine tied to said top turn of each said spring.

25. The spring assembly of claim 24 wherein said twine is attached to the seating structure to each said top turn of each said spring at eight locations on each said top turn.

26. A spring assembly for use in a seating structure, the spring assembly comprising:

a plurality of individual bottom grids, each said bottom grid comprising a plurality of transverse wires and a border wire extending around a periphery of said bottom grid, each said transverse wire terminating at an intersection with said border wire, pairs of said transverse wires combining with portions of said border wire to define bottom grid cells;

a bottom turn of each of a plurality of springs attached to selected ones of said bottom grid cells without benefit of mechanical fasteners;

a top grid attached to a top turn of each said spring without benefit of mechanical fasteners, said top grid comprising a plurality of transverse, longitudinal and diagonal sections of twine tied to said top turn of each said spring at eight locations on each said top turn, wherein top grid is attached to the seating structure; and each said bottom grid having a plurality of springs attached thereto and one of said plurality of springs attached to each said bottom grid is shorter than the other of said plurality of springs.

27. A seating structure comprising:

a frame portion;

a spring assembly attached to said frame portion, said spring assembly further comprising:

(a) a plurality of individual bottom grids, each said bottom grid comprising a plurality of transverse wires and a border wire extending around a periphery of said bottom grid, each said transverse wire terminating at an intersection with said border wire, pairs of said transverse wires combining with portions of said border wire to define bottom grid cells;

(b) a bottom turn of each of a plurality of springs attached to selected ones of said bottom grid cells without benefit of mechanical fasteners; and (c) a top grid attached to a top turn of each said spring without benefit of mechanical fasteners, said top grid comprising a plurality of lateral, longitudinal and diagonal sections of twine tied to said top turn of each said spring at eight locations on each said top turn, wherein said top grid is attached to the frame portion.

* * * * *